June 25, 1963      J. J. ALTHERR      3,095,211

AUTOMATIC BRAKE FOR TELESCOPING CARTS

Filed May 18, 1962

INVENTOR
JACOB J. ALTHERR
BY
ATTORNEY

United States Patent Office 3,095,211
Patented June 25, 1963

3,095,211
AUTOMATIC BRAKE FOR TELESCOPING CARTS
Jacob J. Altherr, 3213 Fendale Ave., Affton, Mo.
Filed May 18, 1962, Ser. No. 195,932
2 Claims. (Cl. 280—33.99)

This invention relates in general to the design and provision of a braking arrangement for the telescoping carts which are commonly used in grocery stores, and similar places, in which the customer gathers his purchases.

The principal purpose of my invention is to provide a brake arrangement for such telescoping carts which is in effect at all times, that is whenever the cart is left untended.

A further purpose of my invention is to provide a brake arrangement in which the simple action of placing the hands on the handle bar of the ordinary telescoping cart will, when it is equipped with my invention, release the brakes and allow the cart to be moved in the customary manner.

An object of this invention is to provide a brake releasing lever parallel to the handle of the cart, either just above the handle or just below the handle so that gripping the lever and the handle and bringing them together will release the brake so that it may be moved.

A further object of this invention is to provide an arrangement of the braking mechanism such that the telescoping of a first cart into a second cart will release the brakes of the second cart. This may be extended to a third, a fourth and the like so that a whole train of telescoped carts may be gathered together in telescoped arrangement and the brakes of all except the first will be automatically maintained in the released position as long as they are telescoped. The first cart will have its brake on and this will be released when the person gathering the carts places his hands on the lever and handle in the above described manner. This is most important since it enables a clerk to gather many carts which customers have scattered haphazardly and move them to a position near the entrance of the store, where they can be available to incoming customers.

An ancillary purpose of this invention is to provide an automatic braking mechanism which can be applied to all the various conventional types of telescoping carts commonly used in grocery stores and the like.

It is a common practice for retail grocery stores to allow customers to use the conventional telescoping carts both inside the store and to carry and transport packages from the store checkout counters to the parking lot associated with the store. The common cart is not equipped with brakes, so that no provision has been made to lock the wheels in position and keep the cart from rolling. The ordinary parking lot is graded at a slight angle so that rain water and melting snow will run off by gravity. Thus the cart is usually placed on a slight incline on the parking lots and is very likely to move about of its own accord causing inconvenience to the person using the cart.

A further object of this invention is to provide a braking mechanism which can be entirely contained within the space between the rear legs of the telescoping carts so that it does not project out at the sides where it might interfere with the passage of other carts or project on the sides to bump against and injure the legs of persons passing by.

All of these telescoping carts are provided with a hinged rear "door" which is raised automatically when the carts are telescoped together. A further object of my invention is to provide a brake mechanism which is released by the action of raising the hinged rear door, as by the telescoping action.

These and additional objects of the invention revealed herein will more clearly appear to those skilled in the art by reference to the accompanying drawings forming a part hereof, wherein like characters of reference designate corresponding parts throughout the several views, in which.

Figures 1, 2, 3:
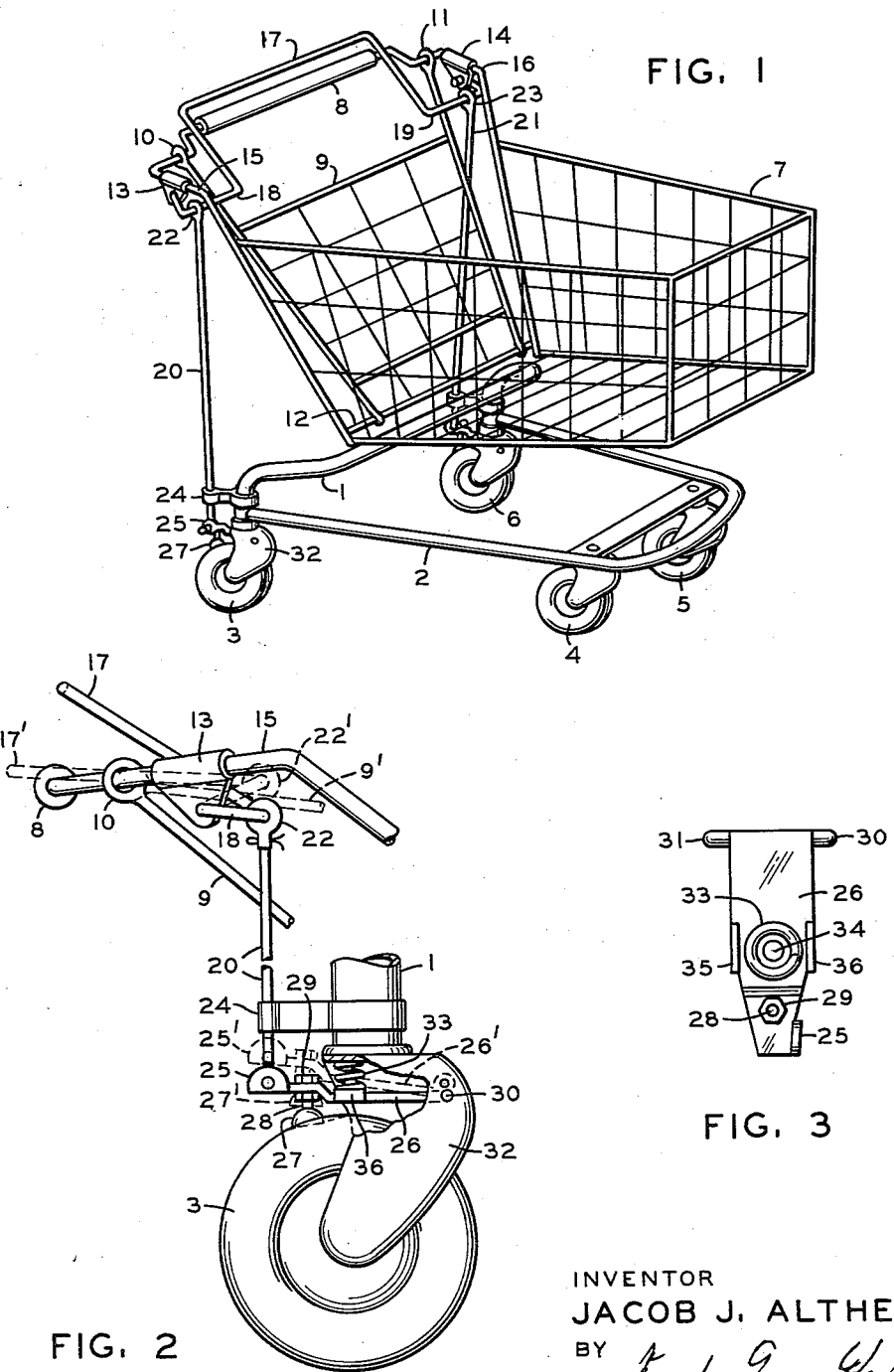
FIGURE 1 is a perspective view of a telescoping cart with the present invention attached.
FIGURE 2 is an enlarged detail view of the right side of the braking arrangement of FIGURE 1.
FIGURE 3 is a top plan view of the brake plate member of FIGURE 2.

In the illustration of FIGURE 1, the cart is shown to be the telescoping carry-out cart type, embodying a lower frame 1, 2 which carries the wheels 3, 4, 5 and 6 in the customary manner. The cart is provided with a basket 7 and a handle 8, all of which are typical and well-known in the art.

Another typical element of the telescoping cart is the hinged rear "door" which is the rear wall of the basket. This rear wall is numbered 9, and is hinged at its upper end by means of the eyes 10, 11 to the handle, while the lower end is free to rest against the rear wall bar 12. All of this is conventional and well known.

To accomplish the purposes and objects of my invention I provide two brackets, which I call brake lever brackets 13, 14 and which are mounted and fixed in position on the handle side extensions 15 and 16 respectively. Mounted between and pivoted at its ends on these brake lever brackets is the brake lever 17, which is formed to have as integral parts thereof the two rear wall actuated arms 18 and 19. These rear wall actuated arms are located near the ends of the brake lever, adjacent the brake lever brackets 13 and 14.

A portion of each of the rear wall actuated arms 18 and 19 is bent to lie parallel to the brake lever and it is this portion which actually is contacted by the rear wall when the carts are telescoped together.

Hingeably hung or pivoted on the rear wall actuated arms 18 and 19 are the brake arms 20, 21, respectively. At their upper ends the brake arms 20, 21 are each provided with a socket 22, 23 respectively, by which they are pivoted on the rear wall actuated arms. In the detail view of FIGURE 2 it will be seen that the brake arm 20 is joined to the socket 22 by means of a cotter pin.

Near its lower end the brake arm 20 passes through a brake arm guide 24, which is simply a bearing member attached by any of numerous expedients to the leg of the frame 1 on which the rear right wheel 3 is mounted.

At its lower end the brake arm 20 terminates by passing through a hole in the semi-circular lug 25 which is an integral part of the brake plate member 26. The brake plate member is a lever which carries the brake cup 27, upon the adjusting bolt 28, secured in place by the brake cup nut 29.

The brake plate member 26 is held in position by two pivot pins 30, 31, shown in FIGURE 3 which are mounted in two holes drilled in the horn 32 of caster wheel 3. Mounted centrally upon the brake plate member 26 is the brake spring 33 which is positioned accurately by means of the centrally located brake spring mounting pin 34 and the spring guards 35, 36. The action of the spring against the upper portion of the horn 32, inside which it is mounted, is to force the brake cup 27 into continuous engagement with the rubber wheel 3. The strength of the spring 33 is such that the brake cup 27 penetrates slightly into the rubber wheel 3 and consequently the wheel cannot turn. The above is also true of the similar mechanism on the wheel 6, as is shown in FIGURE 1, and the net result is that both rear wheels 3 and 6 of FIGURE 1 are unable to turn and the brake is on so that the cart is not able to move.

In operation the person wishing to move the cart has only to place his hands or one hand on the brake lever 17. The result of this action is to move 17 to the position 17' of FIGURE 2. The ends of the lever 17 are pivoted in the brake lever brackets 13 and 14, so that moving of the brake lever 17 to 17' results in moving the elements 18 and 19 to raised positions. This action in turn raises the sockets 22, 23. In FIGURE 2 it will be seen that the socket 22 goes to the position 22'. The result of this movement is to raise the entire brake arm 20. Therefore, since the arm moves upward in FIGURES 1 and 2, the lug 25 is moved upward, raising the lefthand portion of the brake plate member 26, which pivots on the pivot pins 30, 31.

Upward movement of the lefthand portion of the brake plate member 26 compresses the spring 33 and removes the brake cup 27 from its engagement with the wheel 3, thus the cup 27 moves to the position 27'. At the same time a similar train of actions is taking place on the other wheel 6 so that both rear wheels have the brakes released and the cart may be pushed forward or backward freely, since the wheels are free to rotate.

This freedom of movement due to the releasing of the brakes will continue as long as the hand is maintaining a pressure to hold the brake lever 17 in the position 17' against the handle 8. Removal of the hand from the brake lever 17 will allow the brake spring 33 to be released from compression. The brake spring 33 will expand and reverse the above action, pushing the brake cup 27 again into tight engagement with the wheel 3, as well as the corresponding parts on the other rear wheel 6, so that the brakes are applied to the rear wheels 3 and 6 and the telescoping cart cannot move.

Of course it is to be understood that the brake lever position may be reversed with respect to the cart handle 8, that is the brake lever 17 may be initially positioned below or under the cart handle 8 and thus the brake handle lever would have to be raised to actuate releasing of the brakes. I have only illustrated a preferred embodiment.

There is an additional advantage to be derived from the type of braking mechanism I have designed. It is understood best by considering what happens when two carts or more are telescoped together.

Simply consider the case of two carts. If the basket portion 7 is pushed into telescoping arrangement with another cart, here is what happens. The basket 7 raises the rear wall 9 of the second cart. Now looking at the FIGURE 2, it will be seen that this telescoping of the carts accomplishes exactly the same brake release as formerly described. The element 9 of FIGURE 2 moves to the position 9'. In position 9' the rear wall now contacts the rear wall actuated arms 18 and 19. As the rear wall 9 rises to allow the carts to come into complete telescoped arrangement, the arms 18 and 19 are fully raised and the sockets 22 and 23, which they carry are raised also. Thus the socket 22 moves to the position 22' of FIGURE 2. This in turn raises the brake arm 20 and raises the lug 25 to the position 25' as before, compressing the spring 33 and removing the brake cup 27 from engagement with the rubber wheel 3, to the position 27'. The restoring action of the compressed spring is the same as before when the telescoped carts are separated.

Thus it will be seen that the release of the brakes in my arrangement can be effected either by placing a hand on the brake lever 17 and moving it to the position 17' adjacent the handle of the cart, or by telescoping carts together. This last requirement is quite important since it is possible to telescope together as many as ten or twelve or more carts and move them as a train, so long as the one closest to the mover has its brake lever 17 depressed against the handle.

It will be noted that the brackets and brake members do not interfere in any way with the telescoping of the carts, one into the other. Nor do these parts project sidewise at the base of the carts where they might do injury to the legs of persons passing by, or to merchandise.

Although I have herein shown and described only a preferred embodiment of my invention, it is to be understood that various changes, modifications, and variations may be made therein without departing from the invention.

Having thus described my invention, what I claim is:

1. In a telescoping cart having a frame carrying two front wheels and two rear wheels, and a basket provided with a rear wall hingeably hung from a basket handle, a pair of brake lever brackets mounted in fixed positions on said handle at opposite sides of the cart, a brake lever pivotally mounted on and between said brake lever brackets, rear wall actuated arms mounted on said brake lever at opposite ends adjacent said brake lever brackets and adjacent said rear wall, a pair of sockets one of which is mounted on each of said rear wall actuated arms, a pair of brake arms one of which is mounted upon each of said sockets, a pair of brake arm guides, one mounted on the cart adjacent each of said rear wheels and adapted to guide the brake actuating end of each of said brake arms, a pair of brake plate members provided with two pivot pins at one end, a caster horn on each rear wheel, each of said caster horns being disposed around a brake plate member and having the end provided with pivot pins pivoted upon said horn, a brake spring centrally mounted on each brake plate and fixed in position between said brake plate and its associated caster horn, a brake cup member carried upon the underside of said brake plate member and maintainable in engagement with the wheel associated with said caster, horn, and a lug on the brake plate member in which is pivoted the lower end of said brake arm.

2. In a telescoping cart having a handle, a frame on which is mounted two front wheels and two rear wheels, and a basket provided with a rear wall hingeably hung from the handle, a pair of brake lever brackets mounted on said handle at opposite sides of the cart, a brake lever parallel to said handle pivotally mounted on and between said brake lever brackets, rear wall actuated arms mounted on said brake lever at opposite ends thereof and adjacent said brake lever brackets and adjacent said rear wall, a pair of sockets one of which is mounted rotatably on each of said rear wall actuated arms, a pair of brake arms one of which is mounted upon each of said sockets, a pair of brake arm guides one of which is mounted on each side of said frame above each of said rear wheels and adapted to guide the brake actuating end of one of said brake arms, a pair of brake plate members, each provided with two pivot pins at one end, a caster horn on each rear wheel, one of said brake plate members being disposed inside each caster horn and pivoted thereon by means of said pivot pins between said caster horn and its associated wheel, a brake spring centrally mounted on each brake plate and bearing against the underside of the top of the caster horn associated with that plate, a brake cup member mounted on the underside of each brake plate and maintainable in engagement with the wheel associated with said caster horn, and a lug on the brake plate member upon which is pivoted the lower end of said brake arm associated with each brake plate member.

References Cited in the file of this patent

UNITED STATES PATENTS

| | | |
|---|---|---|
| 2,785,906 | Matter | Mar. 19, 1957 |
| 2,916,291 | Young | Dec. 8, 1959 |
| 2,958,537 | Young | Nov. 1, 1960 |
| 3,061,049 | Bramley | Oct. 30, 1962 |